UNITED STATES PATENT OFFICE.

FRANK L. SLOCUM, OF PITTSBURG, PENNSYLVANIA, ASSIGNOR OF ONE-HALF TO CHARLES Y. WHEELER, OF SAME PLACE.

PROCESS OF MAKING GREEN OXID OF CHROMIUM.

SPECIFICATION forming part of Letters Patent No. 524,470, dated August 14, 1894.

Application filed November 27, 1893. Serial No. 492,096. (No specimens.)

*To all whom it may concern:*

Be it known that I, FRANK L. SLOCUM, a resident of Pittsburg, in the county of Allegheny and State of Pennsylvania, have invented a new and useful Improvement in Processes of Making Green Oxid of Chromium; and I do hereby declare the following to be a full, clear, and exact description thereof.

My invention relates to the manufacture of green oxid of chromium, this green oxid being employed in paints, or for coloring purposes, as well as in the chemical arts for the making of metallic chromium and in the treatment of metals.

The object of the invention is to provide a cheap and rapid method of forming the same.

To these ends the invention consists, generally, in wetting a powdered chromate and powdered carbon with hydrochloric acid and subjecting the same to heat, resulting in a metallic chlorid and green oxid of chromium, the latter being this way very cheaply produced.

It also consists in the steps above indicated, and the further steps of moistening the resultant mass with hydrochloric acid and dissolving out the salt from the oxid with boiling water.

To enable others skilled in the art to practice my invention, I will describe the same more fully.

I may employ for the manufacture of the green oxid any suitable chromate, such as the bi-chromate of soda $(Cr_2Na_2O_7)$, or the bi-chromate of potash $(Cr_2K_2O_7)$. These salts should be finely powdered and mixed with about one tenth part of powder carbon, it being preferred that the chromate shall be first moistened with strong hydrochloric acid, as the combination of the carbon with the chromate in its dry state forms an explosive from which accident might occur. I prefer to employ finely divided wood charcoal for the carbon element. The whole mass is then wetted again with hydrochloric acid until brought to a paste, the proportion of acid employed in the entire wetting of the mass being about one part of acid to three of chromate, by weight. This paste is then charged into a suitable furnace, and is allowed to burn without admission of air, the chromate providing the oxygen for combination with the carbon of the mixture, the furnace being heated to about a cherry red. The combustion takes place in a slow form, like the burning of saltpeter paper.

In order to insure the reaction of practically all the particles, while it is still hot, I wet it again with hydrochloric acid by one or more treatments until brought to about the state of mortar. The mass then consists of the green oxid of chromium and the chlorid of sodium or potassium, with a small trace of the original salt, which should not be over one or two per cent. The mass is then heated with boiling water in which the chlorid of sodium or potassium, and the original chromate if any be present, are soluble, and these substances are then separated from the green oxid of chromium by a mechanical process, such as by the filter press. The green oxid of chromium is obtained from the filter press in the form of a hard moist cake.

It is found that by the process above described a pure green oxid of chromium can be obtained which is suitable for use for any of the purposes to which this material has been previously applied, and that it may be obtained at about one-half the cost of producing the green oxid by methods heretofore employed for that purpose.

What I claim as my invention, and desire to secure by Letters Patent, is—

1. The herein-described process of forming green oxid of chromium, consisting in wetting a powdered chromate with hydrochloric acid, mixing therewith powdered carbon, again wetting the mass with hydrochloric acid and subjecting the same to heat, then further wetting the mass with hydrochloric acid and dissolving out the resultant chlorid and any remaining chromate with boiling water, substantially as set forth.

2. The herein-described process of forming green oxid of chromium, consisting in wetting a powdered chromate and powdered carbon with hydrochloric acid and subjecting the same to heat, then further wetting the mass with hydrochloric acid and dissolving out the resultant chlorid and any remaining chromate with boiling water, substantially as and for the purposes set forth.

3. The herein-described process of forming green oxid of chromium, consisting in wetting a powdered chromate and powdered carbon with hydrochloric acid and subjecting the same to heat, and then further wetting the resultant mass with hydrochloric acid, substantially as set forth.

4. The herein-described process of forming green oxid of chromium, consisting in wetting a powdered chromate and powdered carbon with hydrochloric acid and subjecting the same to heat, substantially as set forth.

In testimony whereof I, the said FRANK L. SLOCUM, have hereunto set my hand.

FRANK L. SLOCUM.

Witnesses:
 JAMES I. KAY,
 J. N. COOKE.